United States Patent
Dry et al.

(10) Patent No.: US 6,766,229 B2
(45) Date of Patent: Jul. 20, 2004

(54) METHOD AND APPARATUS FOR MEASURING THE RUNNING GEARS ON A MOTOR VEHICLE

(75) Inventors: Craig Dry, Wolnzach (DE); Stefan Schommer, UnterschlieBheim (DE)

(73) Assignee: Beissbarth GmbH, Munich (DE)

(*) Notice: Subject to any disclaimer, the term of this patent is extended or adjusted under 35 U.S.C. 154(b) by 0 days.

(21) Appl. No.: 09/943,710

(22) Filed: Aug. 30, 2001

(65) Prior Publication Data

US 2002/0095981 A1 Jul. 25, 2002

(30) Foreign Application Priority Data

Sep. 2, 2000 (DE) .......................................... 100 43 358

(51) Int. Cl.$^7$ ................................................ G06F 7/00
(52) U.S. Cl. .......................................... 701/29; 701/33
(58) Field of Search ...................... 701/29, 33; 356/155, 356/139.03, 203.12, 203.18; 33/288, 286, 203; 382/100; 700/279

(56) References Cited

U.S. PATENT DOCUMENTS

| | | | | |
|---|---|---|---|---|
| 5,748,301 A | * | 5/1998 | Muller et al. | 356/155 |
| 5,870,315 A | * | 2/1999 | January | 700/279 |
| 5,943,783 A | * | 8/1999 | Jackson | 33/288 |
| 5,999,867 A | * | 12/1999 | Rogers et al. | 701/29 |
| 6,064,927 A | * | 5/2000 | Molbach et al. | 701/29 |
| 6,178,358 B1 | * | 1/2001 | Colarelli et al. | 700/16 |
| 6,219,134 B1 | * | 4/2001 | Voeller et al. | 356/139.09 |
| 6,252,973 B1 | * | 6/2001 | January et al. | 382/100 |
| 6,263,322 B1 | * | 7/2001 | Kirkevold et al. | 705/400 |
| 6,456,372 B1 | * | 9/2002 | Hudy | 356/155 |

* cited by examiner

Primary Examiner—Yonel Beaulieu
(74) Attorney, Agent, or Firm—Blakely, Sokoloff, Taylor & Zafman LLP

(57) ABSTRACT

In a method and an apparatus for a program controlled wheel alignment measurement of the running gears of vehicles the various steps or groups of steps of the measurement procedure are carried out under the control of a central computer of the wheel alignment system or a microprocessor in a machine-like device for turning the steering wheel of the vehicle. The wheel of the steerable axis are turned and positioned, respectively, under the control of the program to the positions required for carrying out the wheel alignment measurement of the running gears.

19 Claims, 3 Drawing Sheets

METHOD AND APPARATUS FOR MEASURING THE RUNNING GEARS ON A MOTOR VEHICLE

The invention relates to a method and an apparatus for the measurement of the running gears on a motor vehicle, like a passenger car and a truck.

BACKGROUND OF THE INVENTION

Wheel alignment measurement apparatus in which the measurement procedure is carried out with the aid of a program, are, for example, known from the WO99/23451. Therein, the operator is given instructions and support statements during the wheel alignment measurement so that he can carry out the measurement of the running gears and also the adjustment of the running gears in a proper way taking into account the measurement results. As it is known, the wheels have to be positioned, during the wheel alignment procedure, to different direction positions, for example to "driving straight ahead", to a turning position of 10 and 20° to the left and to the right, respectively, and to equal single track positions left and right. One or the other automobile producer furthermore asks for a positioning according to the maximum turn-around position in order to check whether the turning radius is within a desired range, and/or to hold one of the wheels at 0° in order to adjust camber at a track of 0°. Such turning movements of the wheels are carried out by hand in the known apparatus which is cumbersome because the operator has to leave his servicing location under the vehicle where the adjusting works are carried out, and he has to turn the steering wheel. Only thereafter, the wheel alignment measurement and the adjusting works on the running gears related thereto, can be carried on.

From the EP 0 689 512 B1, a remote controlled device for turning the steering wheel of a motor vehicle is known. The steering wheel can be turned into particular positions by means of this device, and it can be brought back to the zero position. If such a device would be used for the wheel alignment measurement, there is still the problem that the point of time of turning the steering wheel and the amount of the turning of the steering wheel, for example 10° or 20° to the left or to the right, is selected in error. If the point of time of the turning of the steering wheel is chosen incorrectly, for example at a time when the previous processing step has not yet been finished, there can be errors in the measurement. If the amount of the turning of the steering wheel is chosen incorrectly, the measurement results cannot be compared to the corresponding values in the specifications of the vehicle producers.

SUMMARY OF THE INVENTION

It is an object of the invention to be able to carry out the wheel alignment measurement of the running gears in such a way, that the operator is burdened by as few as possible hand operations except of the adjustment of the running gears, wherein, in particular, a correct adjustment of the wheels as to the time and the amount of the positioning is rendered possible.

For achieving this object, the inventive method is characterized in that the wheels of a steerable axis are turned or adjusted, respectively, to the positions required for carrying out the wheel alignment measurement of the running gears by means of a program-controlled, machine-like device. Since the positioning of the wheels is carried out by the program controlled device, the operator does not to have to leave his servicing location for carrying out the positioning of the running gears and the adjustment of the running gears, respectively. Furthermore, the operator has not to reach through the open window on the drivers's side of the vehicle in order to operate the steering wheel which could result in an interruption of the measurement beam between wheel alignment apparatus devices. Since the positioning of the wheels is directed program controlled, the correct timing and the correct amounts of the positioning of the steering wheel can be defined.

Furthermore, if a platform hoist serves as a servicing location, the measurement and also the adjustment can be carried out while the hoist is on its elevated position without a latter or similar being necessary in order to enable the operator to turn and adjust the steering wheel.

Finally, the operator has to carry out only the absolutely necessary manual operations and adjustments in order to complete the measurement of the running gears and the adjustments thereof, respectively. The operator is, thereby relieved of routine work, and the measurement and adjustment of the running gears becomes more accurate and reproducible.

An advantageous embodiment of the method of the invention is characterized in that the wheels of the steerable axis are turned and adjusted, respectively, to the positions required for carrying out the wheel alignment measurement of the running gears under the control of a central computer of the wheel alignment apparatusor a microprocessor in the machine-like device. If the program control is carried out in the central computer, the capacity which is available there, can be used. If the program control is carried out in the microprocessor in the machine-like device, a direct communication of the machine-like device can be provided to the measurement sensors, for example by means of a communication processor. Since the program is stored in the microprocessor of the machine-like device, the machine-like device only has to be started with a starting command.

An advantageous embodiment of the method of the invention is characterized in that control procedures like for example the automatic positioning of the wheels to "driving straight ahead", the automatic turning of the wheels to the left and to the right, the automatic positioning to equal single tracks on the left and on the right, the maximum turning position and keeping the wheels on 0°, are stored in the wheel alignment measurement program. Therein, it is advantageous that the control procedures are, so to speak, stored as sequences in the wheel alignment measurement program and can be called up according to the configuration of the wheel alignment measurement program.

An advantageous embodiment of the method of the invention is characterized in that the control procedures are grouped to groups of control procedures wherein one group of control procedures defines the movement of the wheels of the steerable axis during a wheel alignment measurement. Therein, the above-mentioned control procedures are, for example, put together into a group such that the measurement run as a whole can be called up when it is to be carried out, for example, as a starting measurement or as a control measurement after the adjustment of the running gears.

An advantageous embodiment of the method of the invention is characterized in that the control procedures are put together to measurement runs comprising the evaluation of the measurement values of the running gears prior, during and after the adjustment works on the vehicle. Thereby, the control procedures are put together in an advantageous way so that the wheel alignment measurement of the running gears and the adjustment of the running gears can go on in a unitary program.

An advantageous embodiment of the method of the invention is characterized in that the control procedures are vehicle-specific procedures. In the central computer of the wheel alignment apparatus vehicle specific data are anyway stored for carrying out the measurements with different vehicle types of different manufacturers. The control procedures can, therefore, be added without particular additional expenditure to the vehicle specific data already present. When carrying out a wheel alignment measurement of the running gears, only the correct vehicle type has to be chosen in order to get to correct results.

An advantageous embodiment of the method of the invention is characterized in that the operator is given acoustical and/or optical and/or voice information related to the measurement results, required inputs or/and operations. Thereby, it is achieved in an advantageous way that the operator is always informed about the progress of the wheel alignment measurement of the running gears and that he gets instructions when he can or should carry out which adjustments.

An advantageous embodiment of the method of the invention wherein the measurement of the running gears is carried out on a platform hoist, is characterized in that the control of the hoist is also done by the central computer. It is important also for the control of the hoist that is moved upwards or downwards at the correct point of time. The correct timing of the control of the hoist can also be guaranteed by providing a connection to the central computer of the wheel alignment system.

An advantageous embodiment of the method of the invention is characterized in that specific elevation levels for the control of the hoist are stored also for different operators in the central computer such that the hoist can be moved under the control of the program into positions which are optimized for the respective operator.

An advantageous embodiment of the method of the invention is characterized in that the turning of the wheels by means of the machine-like device or the control of the hoist is carried out only when the operator gives a clearing instruction to the central computer whereby the operator has, in an advantageous way, the possibility to step in if the measurement procedure has to be interrupted, for example in case of an accident or the like.

For achieving the above object, a wheel alignment measurement apparatus for the measurement of the running gears of motor vehicles which carries out the single steps of the running gears measurement under the control of a central computer, is characterized by a program-controlled machine-like device which is adapted to turn and adjust, respectively, the wheels of the steerable axis to the positions required for carrying out the wheel alignment measurement of the running gears.

During positioning and adjustment procedures, respectively, the required turning movements of the wheels can be controlled through operating elements of the wheel aligner system, for example by a keyboard, a remote control, a voice control or the like, whereby an additional operator, who was responsible, up to now, for the turning movements of the wheels of the vehicle is not required anymore.

An advantageous embodiment of the apparatus of the invention is characterized in that the program for controlling the wheels of the steerable axis is stored in the central computer of the wheel alignment apparatusor in a microprocessor in the machine-like device.

An advantageous embodiment of the apparatus of the invention is characterized in that the machine-like device is arranged between the steering wheel of the vehicle at a fixed location on the vehicle and is adapted to turn the turning wheel of the vehicle. This embodiment of the apparatus of the invention has the advantage that the previous procedure in which the turning of the steering wheel was carried out through manipulating the steering wheel, is maintained such that the response characteristic of the vehicle is simulated in an optimal way. The known apparatus is modified so that it can be controlled directly from the central computer of the wheel alignment apparatusor the microprocessor in the machine-like device.

Another advantageous embodiment of the apparatus of the invention is characterized in that a steering wheel level device is arranged on the steering wheel which level is also connected to the central computer of the wheel alignment system or to the microprocessor in the machine-like device and which level outputs the information on the zero position of the steering wheel to the central computer. Thereby, the apparatus can be brought back only under the control of the program and with the information from the steering wheel level device to its starting position (zero position) without additional means being necessary for this purpose on the machine-like devices.

An advantageous embodiment of the apparatus of the invention is characterized in that the machine-like device comprises a motor-driven turntable platforms on which the wheels of the steerable axis of the vehicle are stood. This embodiment of the apparatus of the invention has the advantage that no additional devices have to be mounted within the interior space of the vehicle. Furthermore, no additional devices have to be installed for each wheel alignment measurement of the running gears because the motor drive in the turntable platforms is ready for use any time.

An advantageous embodiment of the apparatus of the invention is characterized in that coupling devices for the wireless transmission of data and instructions between the central computer and the machine-like device are provided on the central computer of the wheel alignment apparatus and the machine-like device, whereby the data transfer between the machine-like device at the central computer can be effected without additional manipulations like plugging in of cables.

An advantageous embodiment of the apparatus of the invention is characterized by a remote control by which a clearing instruction can be given to the central computer in order to actuate the machine-like device whereby the above-mentioned control facility is put into practice in a simple way.

An advantageous embodiment of the apparatus of the invention wherein the wheel alignment measurement of the running gears is carried out on a platform hoist which comprises a control means, is characterized in that the control means of the hoist comprises a interface for transferring data and instructions between the control means of the hoist and the central computer. Thereby, the hoist and the control thereof, respectively, is totally integrated into the wheel alignment system.

A further understanding of the nature and advantages of the embodiments of the present invention may be realized by reference to the remaining portions of the specification and the drawings.

BRIEF DESCRIPTION OF THE DRAWINGS

Embodiments of the invention are now described with reference to the drawings in which.

DESCRIPTION OF THE SPECIFIC EMBODIMENTS

Figure 1:
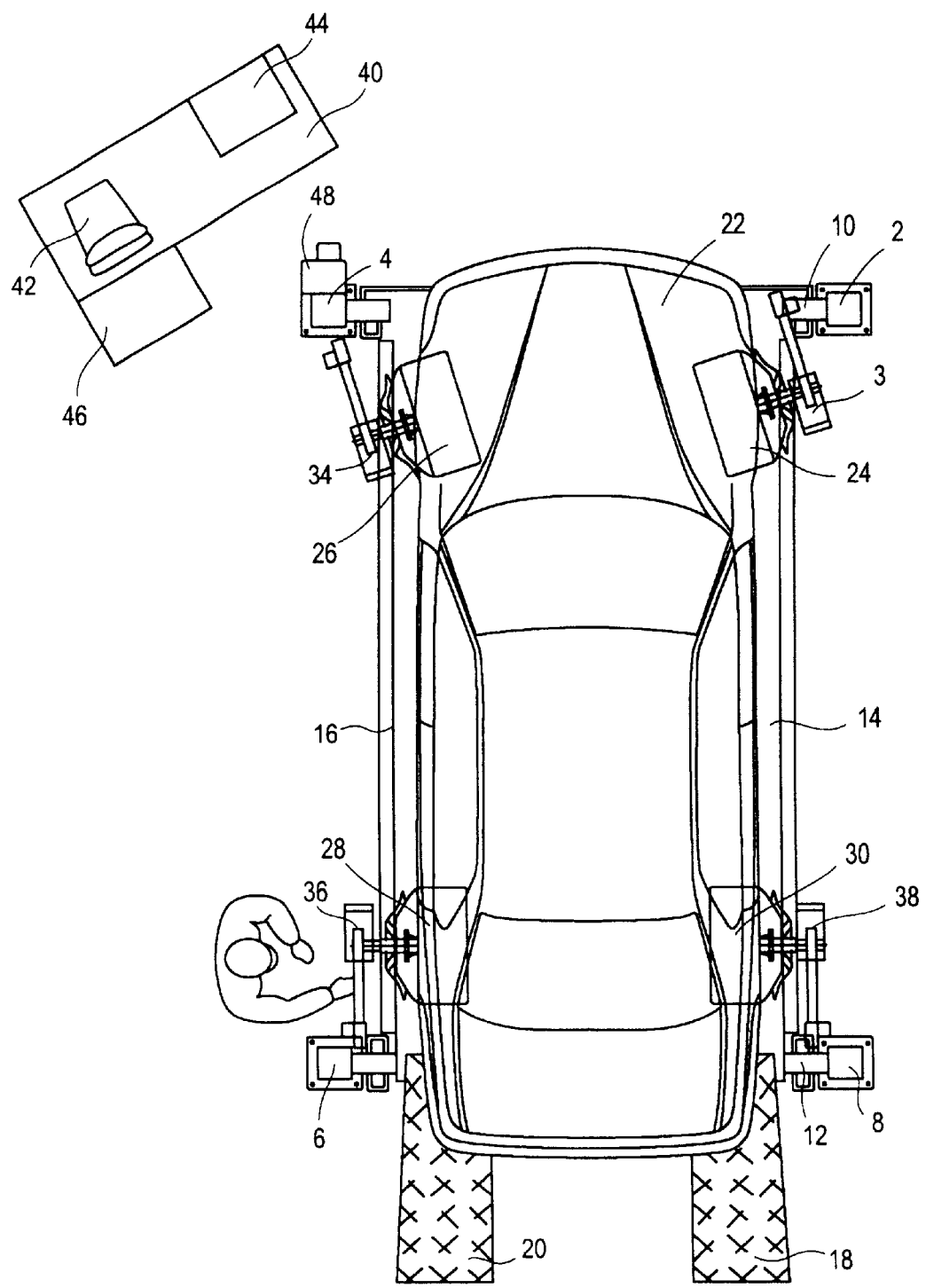
FIG. 1 is a schematical top view of the hoist service station with a vehicle.

FIG. 1 shows schematically a hoist in top view which comprises four columns 2, 4, 6, 8 on which two transverse supports 10, 11 are arranged for being moved upwards and downwards. The two transverse supports 10, 11 carry two driving tracks 14, 16. Finally, two programs 18, 20 are provided across which a vehicle can drive onto the driving tracks 14, 16. A vehicle 22 is shown standing on the driving tracks 14, 16.

Measurement heads 32, 24, 26, 28 as they are known in connection with wheel alignment systems, are arranged on the four wheels 24, 26, 28, 30 of the vehicle 22. A so-called eight-sensor-wheel alignment system is shown by means of which the wheel positions of the wheels of the vehicle with respect to each other can be measured. The wheel alignment apparatus of this general design is shown, for example, in the above mentioned WO99/23451. The measurement values of the measurement heads are evaluated in a central computer and are converted into wheel alignment data. The computer is arranged in a housing 40 and is connected to a monitor 42 and a printer 44. The keyboard for the computer can be arranged on a table 46. In the embodiment shown, the computer is connected through a wireless communication connection with the measurements heads 32 to 38. The central computer is, furthermore connected through a wireless communication connection with the control means 48 of the hoist in order to control the upwards and downwards movement thereof.

Figure 2:
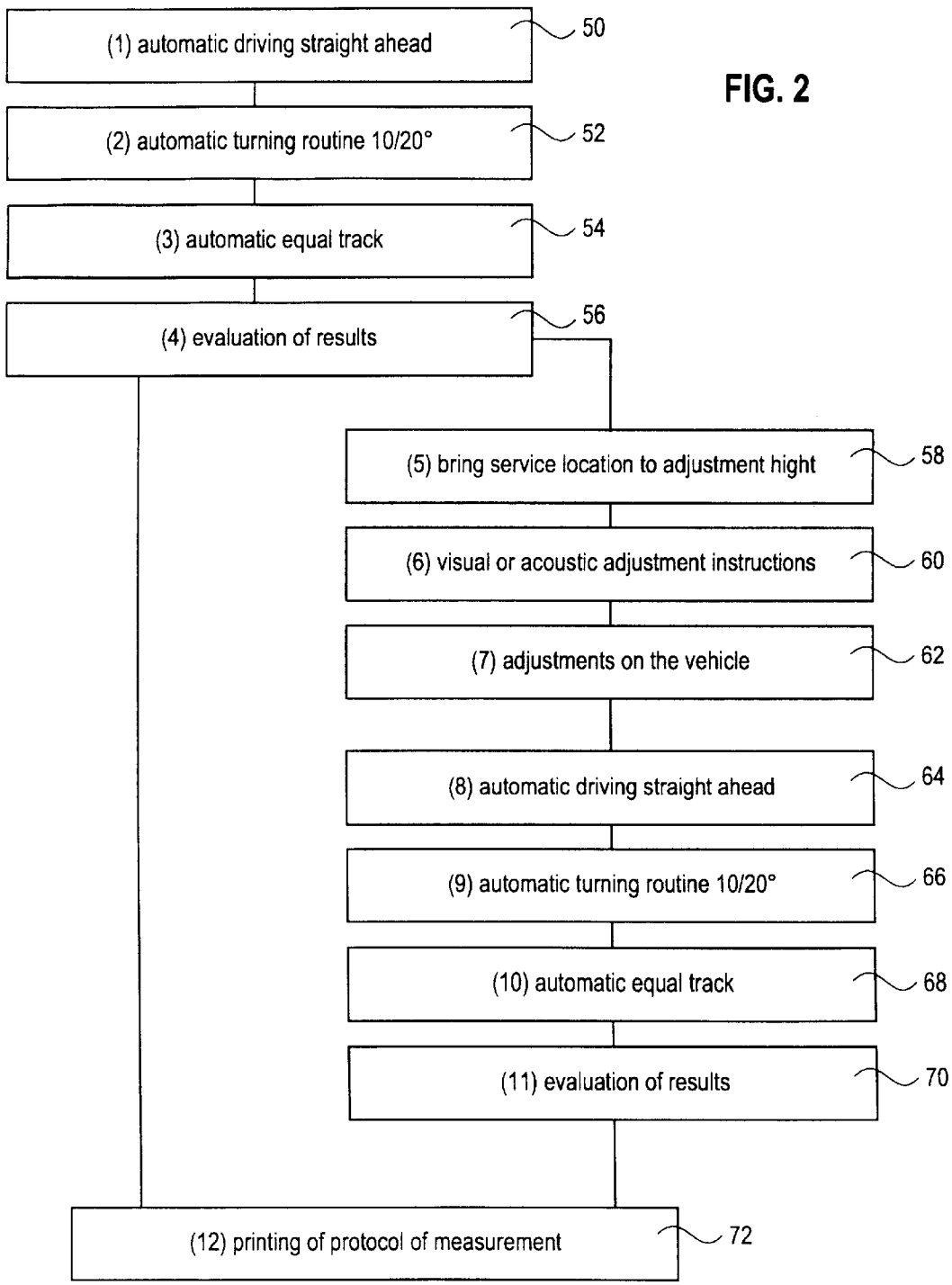
FIG. 2 is a flow-chart for the measurement of the running gears.

FIG. 2 shows the procedure wheel alignment measurement of the running gears, and in particular the sequence of the steering wheel movements as it is carried out during such a measurement. During a wheel alignment measurement of the running gears and the adjustment thereof, the wheels are positioned at first in a step 50 automatically to "driving straight ahead". After reading the corresponding measurement data into the central computer, next the automatic turning routine to 10° and 20 to the left and to the right, respectively, is carried out on the wheels of the steerable axis in the step 52. After reading the corresponding measurement values from the measurement heads 32 to 38, an adjustment of the wheels 24, 26 to equal single track of the wheels is automatically carried out in step 54. After the measurement values have been read into the computer after this step 54, the measurement results are evaluated in step 56 and are printed out immediately or later on. After the running gears have been measured in this way, adjustments works have to be carried out on the wheel suspension of the wheels, if necessary. If the service location is a platform hoist, the hoist is brought to an adjustment position for carrying out the adjustments so that the adjustment works can be carried out from underneath the vehicle. Also during the adjustment, the operator receives adjustment instructions visually or acoustically so that he can carry out the adjustment works with the required accuracy and care. The adjustments works on the vehicle are carried out in step 62 according to the adjustment instructions.

After the adjustment works have been carried out, a control measurement for the running gears is carried out which is done in steps 64, 66, 68, 70 like in the steps 50 to 56. Thereafter, the measurements results are printed out on the printer 44 in step 72.

Is is apparent from this sequence that, during the measurement and the adjustment, some manipulations for turning and positioning, respectively, of the wheels of the steerable axis and also movements of the hoist are necessary. All these movements are automatically done and integrated into the wheel alignment procedure according to the preferred embodiment of the invention.

After the starting measurement values have been ascertained, the program guides the operator automatically through the sequences for the eventually necessary adjustments and through the complete procedure to and including the end measurement.

In the method of the invention, the wheels of the steerable axis are automatically turned and positioned, respectively, into the positions required for carrying out the wheel alignment measurement of the running gears under the control of the central computer or of a microprocessor in the machinelike device. The control procedures: automatic positioning of the wheels to "driving straight ahead", automatical turning of the wheels to the left and to the right and automatically positioning to equal single tracks left and right, are stored in the wheel alignment measurement program as vehicle specific control procedures and are grouped to groups of control procedures whereby a group of control procedures defines the movement of the wheels of the steerable axis during a wheel alignment measurement of the running gears.

The groups are, in turn, put together to measurement runs which comprise the detection of the running gears measurement values prior, during and after the adjustments on the vehicle. The operator is given acoustical and/or optical and/or voice instructions concerning measurement results, required inputs or/and operations during the procedure. If the measurement of the running gears is carried out on a platform hoist, the control of the hoist is also carried out from the central computer. The apparatus is designed such that the positioning of the wheels and the control of the hoist is effected only when the operator issues a clearing instruction to the central computer.

Figure 3:
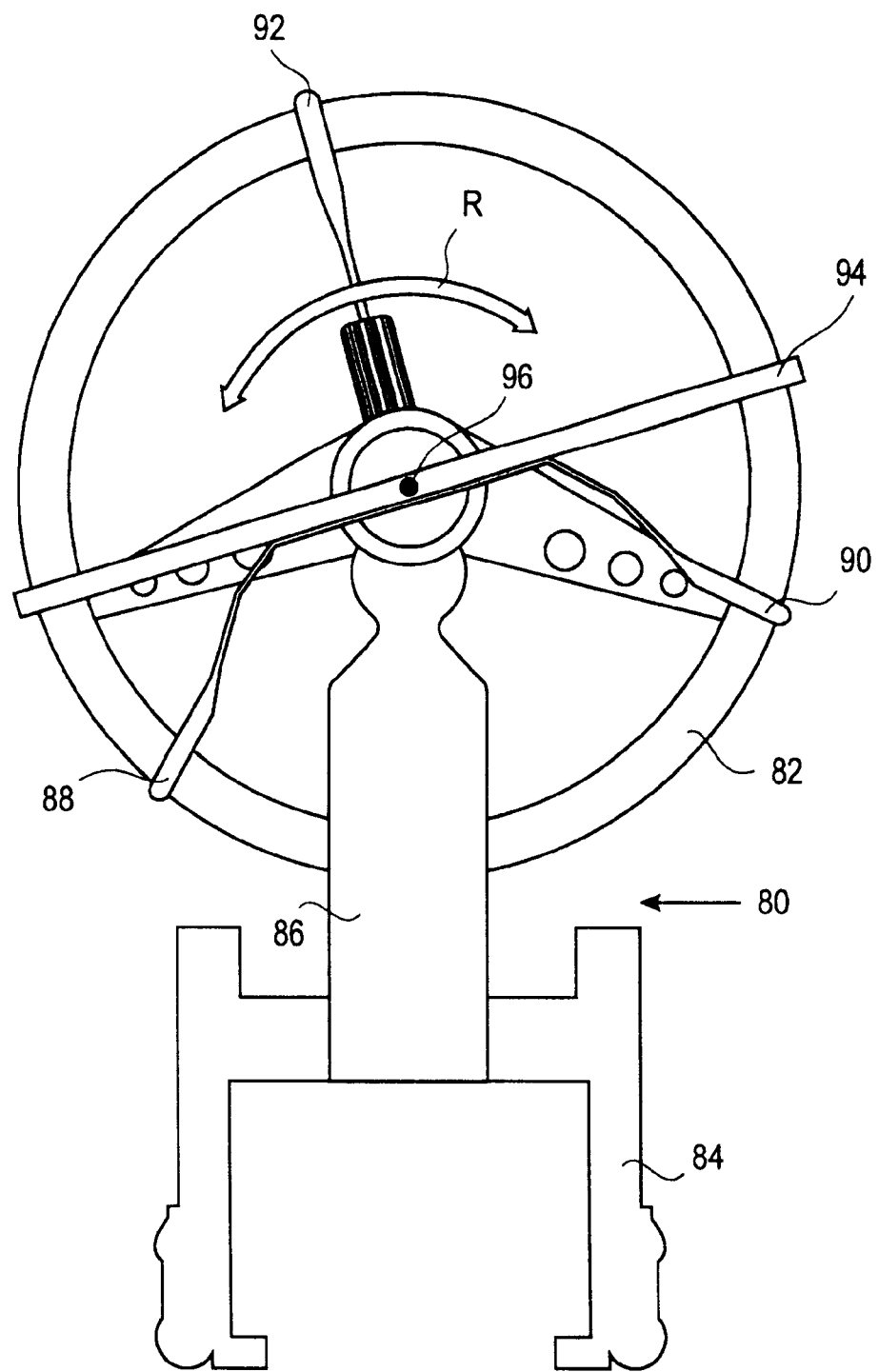
FIG. 3 is a top view of a device for turning the steering wheel of a vehicle.

FIG. 3 shows a schematical representation of a device 80 for turning of a steering wheel 82. The device 80 comprises a fixture 84 by which is may be anchored below the driver's seat. Furthermore, the device 80 comprises a housing 86 in which the driving motor for the device is housed, and it comprises three claws 88, 90, 92 which are fixed to an arm 94 which is pivotable about a rotating axis 96 by means of the motor in the housing 86. The claws 88, 90, 92 may be fixed to the steering wheel 82 such that the steering wheel can be turned backwards and forwards in the direction of arrow R upon pivoting the arm 94.

Furthermore, the device comprises a steering wheel level device (not shown) which is connected through an interface and a wireless communication connection to the central computer of the wheel alignment system like the device 40 itself. The computer control the device 80, the zero position of the steering wheel being input by means of the steering wheel level device.

It is to be understood that the above description is intended to be illustrative and not restrictive. Many embodiments will be apparent to those skilled in the art upon reviewing the above description. The scope of the invention should, therefore, be determined not as reference to the above description, but should instead be determined with reference to the appended claims along with the full scope of equivalence to which such claims are entitled.

What is claimed is:

1. A method to perform wheel alignment measurements on wheels of a vehicle, comprising:

using a central computer to control the wheel alignment measurements using a wheel alignment program; and using a machine operable by a machine control program included in the wheel alignment program, to turn and to position the wheels of a steerable axis of the vehicle to positions required for the wheel alignment measurements, wherein the machine control program that includes a plurality of control procedures for automatic positioning the wheels including any of the procedures for positioning the wheels to "drive straight ahead", for automatically turning the wheels to the left and to the right, for automatically positioning the wheels to "single track left" and "single track right", for turning the wheels to a maximum angle, and for maintaining the wheels at 0°.

2. The method according to claim 1, wherein the machine control program is provided either in the central computer or in a microprocessor in the machine whereby the machine is controlled by the central computer or by the microprocessor in the machine.

3. The method according to claim 1, wherein the plurality of control procedures are incorporated into one or more measurement runs, the one or more measurement runs including an evaluation of values of the wheel alignment measurements done prior, during and after adjustment procedures on the vehicle.

4. The method according to claim 3, wherein the control procedures are specific to the vehicle.

5. The method according to claim 1, wherein the plurality of control procedures are grouped into one or more groups, each of the one or more groups of the control procedures defining movement of the wheels along the steerable axis during the wheel alignment measurements.

6. The method according to claim 5, wherein the plurality of control procedures are incorporated into one or more measurement runs, the one or more measurement runs including an evaluation of values of the wheel alignment measurements prior, during and after one or more adjustment procedures on the vehicle.

7. The method according to claim 6, wherein the control procedures are specific to the vehicle.

8. The method according to claim 1, further comprising outputting to an operator results of the wheel alignment measurements and providing the operator with instructions on required inputs and manipulations in the form of one or more selected from the group consisting of acoustical statements, optical statements, and voice statements.

9. The method according to claim 1, wherein the wheel alignment measurement is carried out on a platform hoist, the platform hoist is controlled by the central computer.

10. The method according to claim 9, wherein a plurality of level inputs to control the platform hoist are stored in the central computer, the plurality of level inputs are specific to an operator.

11. The method according to claim 9, wherein movements of the wheel and movements of the platform hoist are effected in response to a clearing instruction issued to the central computer.

12. An apparatus for performing wheel alignment measurements on wheels of a vehicle, comprising:

a central computer to control execution of the wheel alignment measurements using a wheel alignment program; and a machine operable by a machine control program included in the wheel alignment program, to turn and to position the wheels of a steerable axis of the vehicle to positions required for the wheel alignment measurements, wherein the machine control program includes a plurality of control procedures for automatic positioning the wheels including any of the procedures for positioning the wheels to "drive straight ahead", for automatically turning the wheels to the left and to the right, for automatically positioning the wheels to "single track left" and to "single track right", for turning the wheels to a maximum angle, and for maintaining the wheels at 0°.

13. The apparatus according to claim 12, wherein the machine control program is provided either in the central computer or in a microprocessor in the machine whereby the machine is controlled by the central computer or by the microprocessor in the machine.

14. The apparatus according to claim 12, wherein the machine is located between a steering wheel of the vehicle and a fixed point on the vehicle.

15. The apparatus according to claim 12, further comprising a steering wheel level device on a steering wheel, the steering wheel level device coupled to the central computer or the microprocessor to output information on a zero position of the steering wheel to the central computer.

16. The apparatus according to claim 12, wherein the machine further comprises a motor-driven turntable platform on which the wheels along the steerable axis stand during the wheel alignment measurements.

17. The apparatus according to claim 12, further comprising a plurality of interface devices to wirelessly transmit data and commands between the central computer and the machine.

18. The apparatus according to claim 12, further comprising a remote control to send a clearing instruction to the central computer to enable operation of the machine.

19. The apparatus according to claim 12, wherein the wheel alignment measurements are carried out on a platform hoist in response to a control device, the control device comprises an interface device to transfer data and instruction between the control device and the central computer.

* * * * *